Patented Aug. 10, 1937

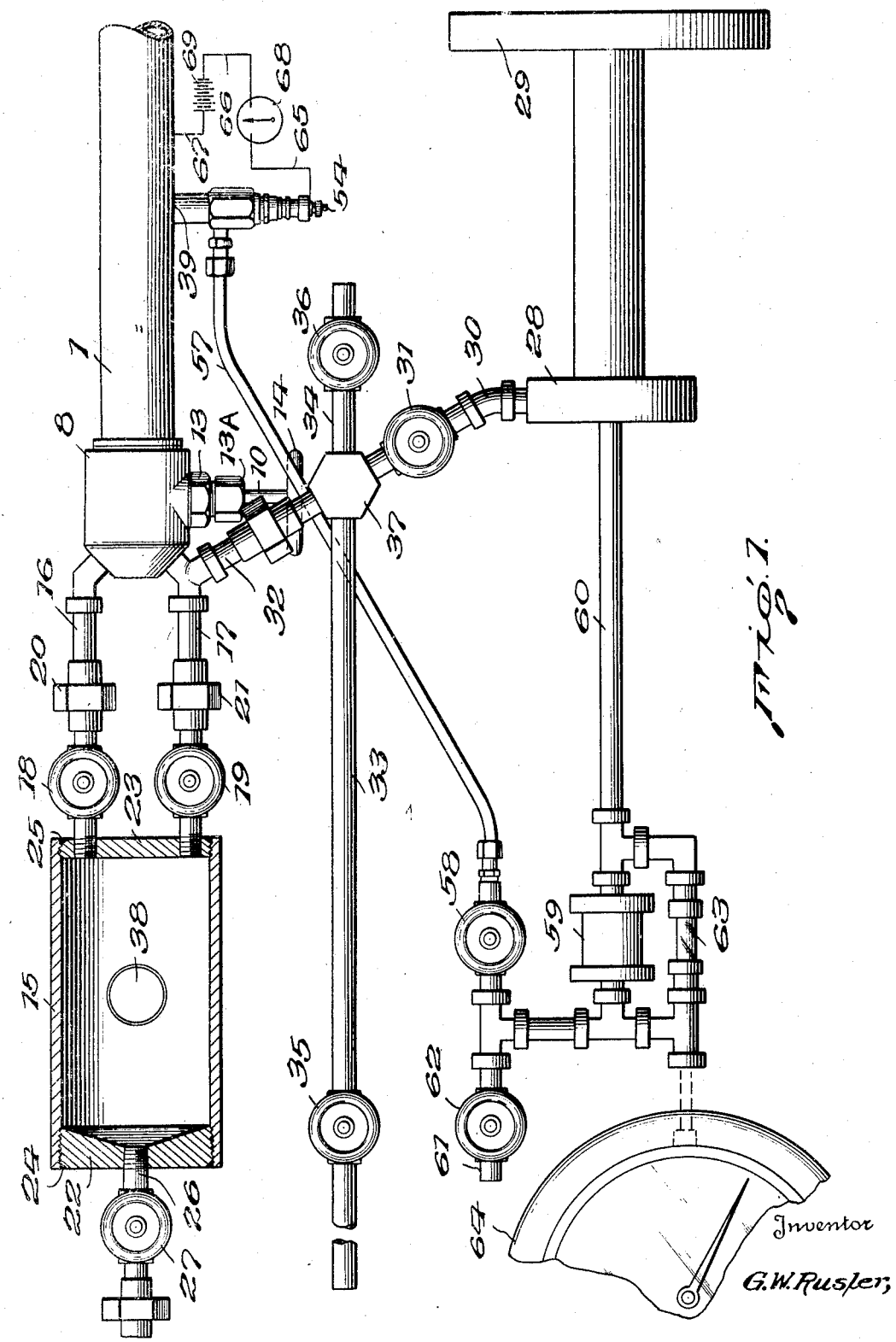

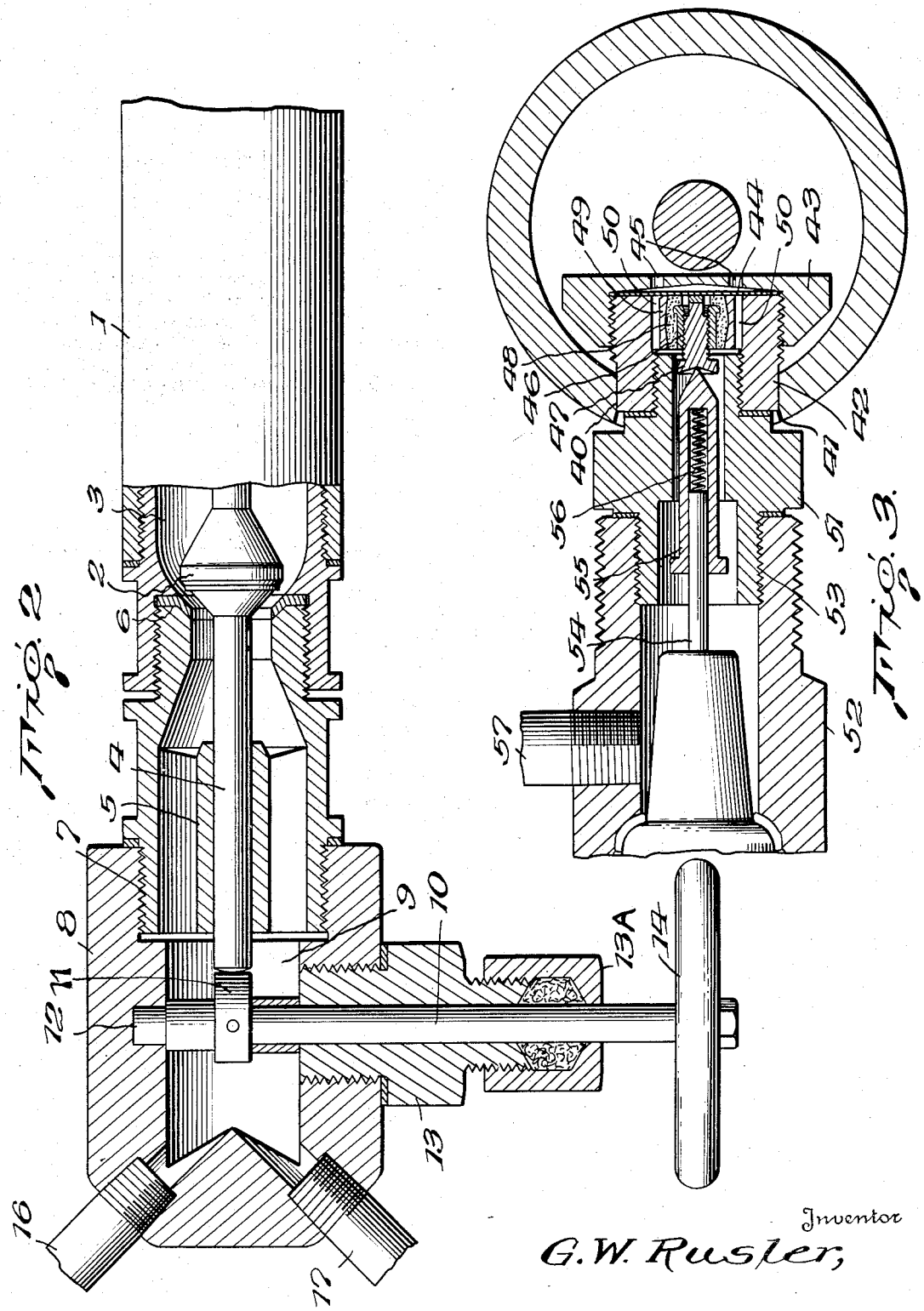

2,089,621

UNITED STATES PATENT OFFICE 2,089,621

METHOD OF AND APPARATUS FOR TRANSFERRING FLUIDS UNDER PRESSURE

George W. Rusler, Verona, Pa., assignor to Gulf Research & Development Company, Pittsburgh, Pa., a corporation of Delaware Application April 8, 1936, Serial No. 73,387

15 Claims. (Cl. 137—78)

This invention relates to a method of and apparatus for transferring fluids under pressure; and it comprises determining the pressure and volume of the fluid to be transferred, establishing and maintaining an equal pressure on a body of a second fluid of greater volume than the first fluid, inert as regards the first fluid and of greater density or weight than said fluid, establishing and maintaining communication between the fluids, and thereafter transferring the first fluid by gravitational displacement by the second fluid; and it further comprises apparatus useful in the performance of this method, said apparatus comprising a valved, bottom hole well sampler adapted to contain a sample of fluid under pressure, means permanently connected to the sampler for determining the pressure of sample fluid entrapped therein, a container for receiving fluid from the sampler, disposed above the sampler, the container also being provided with means permanently connected thereto for determining the pressure of fluid therein, sampler valve bleeding means adapted to be attached to the sampler to open the sampler valve, a valved sampler delivery conduit connecting the sampler, through the sampler valve bleeding means, with the container, a valved, sample displacement fluid delivery conduit connecting the container with the sampler, also through the sampler valve bleeding means, said container, valve conduits and sampler valve bleeding means being adapted to hold a displacement fluid, inert as regards the sample fluid and of greater density or weight than said fluid, and means for applying pressure to the displacement fluid equal to the pressure of the fluid entrapped in the sampler whereby upon opening the sampler valve the heavier displacement fluid in the container will pass downwardly into the sampler and displace the fluid in the sampler upwardly into the container; all as more fully hereinafter set forth and as claimed.

Recovery of oil from wells drilled into the earth is usually accompanied with the taking of samples of the well fluids from the bottoms of the wells, or from various points in the flow strings of wells as they exist in the natural state as to pressure, etc.

It is desirable that the sample so taken be maintained for examination in exactly the same condition as when taken in order that fundamental data, such as pressure, gas to oil ratio, etc., can be determined with accuracy. Examination of sample well fluids under such conditions requires an especially equipped laboratory of substantial size which frequently cannot be located close to the oil wells, and therefore the samples must be transported many miles to the place of testing or examination. Ordinarily, the sampler or instrument used in the well for taking the sample is itself sent to the laboratory with the sample entrapped therein and is used as a test bomb in the examination of the sample. This is because of the difficulty of transferring the sample fluid from the sampler to a separate transportation container or test bomb and at the same time maintaining it at the same pressure and volume at which it was originally secured. The sampler is a delicate and expensive instrument, or piece of apparatus, and its use as a transportation medium or test bomb is costly. Further, the primary usefulness of the sampler, i. e., for taking samples of fluids from a well, is necessarily suspended during its trip to the laboratory and additional samplers are required in order to prevent loss of time.

In methods of transferring samples of well fluid from a sampler to a transportation tank or test bomb, the tank, filled with mercury, is connected in series with a pump and sampler, and brought up to the pressure of the fluid in the sampler. Mercury is then simultaneously withdrawn from the container and pumped into the sampler to displace the well fluid from the sampler into the container. Since these operations must be performed at the same rate in order to preserve the pressure of the sample, the operation is a difficult one to perform with entire success.

Among the objects achieved by the present invention are: the provision of a method for transferring such fluids under pressure from a sampler to a transportation tank or test bomb without change in pressure or volume of the fluid transferred, the provision of a method for effecting such transfer wherein the transfer takes place naturally and by displacement of the fluid to be transferred by another fluid of greater weight or density, and the provision of suitable apparatus for carrying out the above process.

In the accompanying drawings wherein for the purpose of illustration there is shown one form of a specific embodiment of apparatus useful in the performance of the above process and within the purview of my invention;

Fig. 1 is a plan view partly in section showing the transfer apparatus attached to the end of a sampler;

Fig. 2 is a longitudinal sectional view of the sampler valve and valve bleeding or operating means, and Fig. 3 is a transverse section through the pressure diaphragm electric switch in the sampler and shows the method of making electrical connection with and applying external fluid pressure to the diaphragm.

Referring to the drawings wherein like numerals indicate corresponding parts throughout the several views, 1 designates the end of a well sampler provided with a valve 2 opening inwardly of the sample chamber 3. The valve is held in operative position by its stem 4 in guide 5 and the head of the valve engages with seat 6 when the valve is closed. Threaded to the end of the sampler as at 7 is a combined sampler valve bleeding device and pipe coupling member 8. This member has a chamber 9 adjacent the end of the sampler and the valve stem 4 projects into the chamber 9. Projecting laterally through the chamber 9 is a cam shaft 10 carrying a cam 11 so arranged that the periphery of the cam engages the end of valve stem 4 to open the valve upon rotation. One end of cam shaft 10 is journaled in a recess 12 in the coupling member 8. At the opposite side of the coupling member the cam shaft is journaled in packing gland 13 provided with the packing nut 13A. The outer end of the cam shaft 10 carries hand wheel 14 so that the cam may be rotated by hand. Chamber 9 in the sampler valve bleeder is connected to a transportation tank or test bomb 15 by means of pipes 16 and 17 on either side of the neck portion of the bleeder, shown best in Figs. 1 and 2. These pipes are valved as at 18 and 19 and provided with unions 20 and 21 respectively for ready attachment and detachment to and from the sampler. Tank 15 consists of a strong metal cylinder of slightly greater volumetric capacity than the capacity of the sample receiving chamber in the sampler. The tank is closed at its ends by threaded disklike members 22 and 23 welded as at 24 and 25 to provide a sealed or fluidproof joint. End 22 is provided with outlet pipe 26 valved as at 27, while end 23 receives the pipes 16 and 17 at substantially diametrically opposite points.

The transportation tank or test bomb and the sampler valve bleeding apparatus are adapted to be filled with mercury or other fluid immiscible with, heavier than and inert as regards the fluid entrapped in the sampler and under pressure equal to the pressure of the fluid in the sampler. Pressure is applied by means of a pump 28 (diagrammatically shown) operated by hand or power wheel 29. The pump is connected to one side of the valve bleeder through a pipe 30 valved as at 31 and joined by a union 32 to pipe 17. Pipe 30 has branch pipes 33 and 34 valved as at 35 and 36 respectively, connected to it at 37 intermediate the union 32 and valve 31. These branch pipes are used to fill the apparatus with mercury or drain mercury therefrom as will be presently described.

Both the sampler and transportation tank or test bomb are provided with pressure responsive diaphragm electric switches 38 and 39 respectively for measuring the pressure of fluids contained therein. These switches are identical in both construction and operation and for this reason the switch as applied to the sampler only, will be described. Referring to Fig. 3 the wall of the sample receiving chamber has an opening 40 therethrough in which is welded as at 41 a short nipple 42. The inner end of this nipple is threaded externally to receive cap 43 which tightly clamps a pressure responsive diaphragm 44 against the end of the nipple. Cap 43 is perforated as at 45 and relieved slightly on its inner side opposite the diaphragm to permit fluid pressure on the inside of the chamber to exert itself against the inner face of the diaphragm. On the inside of the nipple adjacent the outer face of the diaphragm is a thimble 46 carrying an adjustable contact screw 47 for making electrical contact with the diaphragm. The thimble is insulated from the nipple by a sleeve of porcelain or other suitable insulating material 48 embedded in an inner flange 49 on the nipple. Flange 49 is perforated as at 50 to permit fluid pressure to be applied to the outer or exterior face of the diaphragm. The nipple is threaded internally at its outer end to receive a coupling member or adapter 51 to which is screwed a conventional form of plug of spark-plug type 52 threaded as at 53 for attachment to the adapter. Electrode 54 of the spark plug has fitted to its end a plunger 55 and spring 56 for propelling the plunger against the end of contact screw 47 thereby making electrical contact with the screw. In practice, preparatory to obtaining a sample of well fluid, contact screw 47 is adjusted to just contact diaphragm 44 when the diaphragm is in its neutral or undistorted position. Communicating with the interior of the spark plug adjacent the electrode is a pipe 57 for admitting fluid pressure into the plug through the adapter and through perforations 50 in the inner flange of the nipple, to the exterior face of the diaphragm.

In the set up shown in Fig. 1 pump 28 is arranged to apply fluid pressure to the exterior face of the pressure diaphragm in the sampler as well as to apply pressure to the mercury in the transportation tank after the pressure of the fluid entrapped in the sampler has been determined. In this arrangement pipe 57 connects at its opposite end through a valve 58 with a mercury-oil separating chamber 59 connected to pump 28 through pipe 60. The separating chamber is also provided with an oil inlet pipe 61 valved as at 62 and a sight glass 63 for determining the level of oil and mercury in the separating chamber. 64 is a pressure gauge connected as shown to indicate the pressure imposed on the fluids in the system by the pump.

In operation, when it is desired to transfer the contents of the sampler to tank 15 for transportation or testing purposes, the tank, sampler valve bleeding apparatus and pump are connected to the sampler as shown in Fig. 1 and pipe 57 is run from the oil-mercury separating chamber to the sampler pressure diaphragm electric switch. The sampler and the switch are then made a part of an electric circuit by wires 65, 66 and 67 connecting electrode 54 to one terminal of a high resistance volt-meter 68, the opposite terminal of the volt-meter to one terminal of a battery 69 and the opposite terminal of the battery to the metal body of the sampler. The electric circuit is completed from the sampler body through diaphragm 44 and contact screw 47 to electrode 54. The apparatus is then arranged in a vertical position with tank 15 disposed directly over the sampler and the mercury separating chamber above the pump. With valve 36 closed and the rest of the valves excepting valve 2 in the sampler open, mercury is poured through pipe 33 into the pump and mercury-oil separating chamber until it fills the bottom half of the chamber as indicated by sight glass 63. Valves 35 and 31 are then closed and oil poured into the system through pipe 61. The pressure diaphragm electric switch, pipe 57 and the upper half of the mercury-oil separating chamber 59 and pressure gauge 64 is thus filled with oil. Valve 62 is then closed and pump 28 operated by turning hand wheel 29. Pressure developed by the pump through the mercury in pipe 60 and oil in pipe 57 is expended against the exterior face of diaphragm 44 through the openings 50 in the flange on the nipple. The pump is continued in operation until the pressure developed moves the diaphragm slightly away from the contact screw thus breaking or opening the electric circuit as indicated by the volt-meter. This external fluid pressure on the diaphragm recorded by gauge 64 at this instant will be substantially exactly equal to the pressure of the fluid entrapped in the sampler provided the contact screw just contacts with the diaphragm and does not exercise pressure against the diaphragm to distort it or is not spaced from the diaphragm so that the diaphragm is distorted by the pressure of the entrapped fluid to contact with the screw. Under these conditions any difference in pressure between the making and the breaking points of the circuit will be caused by the stiffness or rigidity of the diaphragm itself and with a suitable diaphragm will be so small as to be practically indiscernible on the pressure gauge. This is so particularly in view of the fact that the current flowing in the circuit is small and an almost infinitesimal movement of the diaphragm serves to rupture the circuit.

With the pressure of the fluid in the sampler known, the next step is the filling of the transportation tank with mercury, subjecting the mercury to a like pressure and transferring the sample fluid into the tank by displacement with the mercury. This is accomplished by relieving the system of pressure by opening valve 31 or reversing the pump. Then with valves 18, 19, 27, 31 and 35 open and valves 36 and 62 closed the remainder of the system not heretofore filled with mercury or oil as above described is filled with mercury by pouring through pipe 33. Valves 35 and 27 are then closed and the pump operated as before until pressure gauge 64 records the pressure in the system equal to the pressure heretofore recorded of the fluid in the sampler. Upon reaching this stage valve 31 is closed and cam 11 operated by turning hand wheel 14 to force sampler valve 2 off its seat. Mercury in tank 15, because of its greater weight, will then run into the sampler, and well fluid from the sampler will rise upwardly into the tank taking the place of the mercury. Passage of the well fluid and the mercury between the sampler and the tank takes place through pipes 16 and 17. Upon completion of this displacement tank 15 because of its slightly larger size than the sample receiving chamber in the sampler, will contain all of the well fluid heretofore in the sampler plus a small amount of mercury, while the sampler will be filled with mercury only. Valves 18 and 19 are then closed, unions 20 and 21 broken and replaced by sealing caps to prevent escape of fluid from tank should valves 18 and 19 leak. Valve 27 at the end of the tank may also be similarly capped to prevent loss of fluid and the transportation tank is then ready for shipment or for use as a test bomb in the examination of the well fluid contained therein.

The sampler and pump may be drained of mercury through valve 36 and the sampler cleaned and reconditioned for use for taking another sample. In case the well fluid is composed of sour oil any mercury sulphide formed in the sampler can be skimmed off and sent along with the transportation tank to the laboratory thus preserving the entirety of the sample.

The provision of two pipes connecting the tank with the sampler, namely pipes 16 and 17 causes the displacement to take place naturally and easily and without undue admixture of the displacement fluid with the sample of well fluid. The tendency is for the well fluid to pass upwardly through one of the pipes and the mercury to pass downwardly through the other pipe, thus establishing a smooth cyclic flow of the fluids between the containers.

What I claim is:—

1. Method of transferring fluids under pressure without change in volume or pressure of the fluid transferred which comprises determining the pressure and volume of the fluid to be transferred, establishing and maintaining an equal pressure on a body of a second fluid, said second fluid being inert as regards the fluid to be transferred and of greater weight than said first fluid, establishing and maintaining communication between said fluids and thereafter transferring the first fluid by gravitational displacement by the second fluid.

2. The method of transferring sample well fluids under pressure in a well sampler to a transportation tank or test bomb without change in pressure or volume of the well fluid which comprises determining the pressure and the volume of the well fluid in the sampler, establishing and maintaining an equal pressure on a body of a second fluid of greater volume than the fluid to be transferred, inert as regards said fluid and of greater weight than said fluid, establishing and maintaining communication between the fluid in said well sampler and said second body of fluid and thereafter transferring the well fluid from said well sampler by gravitational displacement with the second fluid.

3. The method of transferring fluids under pressure from one container to another without change in volume or pressure of the fluid transferred, said fluid consisting of a mixture of gases and liquids and gas dissolved in liquid which method comprises determining the pressure and volume of the fluid to be transferred in one container, establishing and maintaining an equal pressure on a body of a second fluid of greater volume than said first fluid inert as regards said first fluid and of greater weight than said fluid in a second container, establishing and maintaining communication between said fluids, disposing said second body of fluid above said first body of fluid whereby the second body of fluid because of its weight will pass downwardly into the first container and displace fluid therein upwardly into the second container and thereafter sealing and removing the second container from the first container.

4. The method of transferring fluids under pressure from one container to another without change in volume or pressure of the fluid transferred which method comprises determining the pressure and volume of the fluid to be transferred in one container, completely filling a second container of greater volume than said first container with a fluid substantially inert as regards said first fluid and of greater weight than said first fluid, applying pressure to the fluid in said second container substantially equal to the pressure of the fluid in said first container, disposing said second container and fluid above said first container and establishing and maintaining communication between said fluids whereby gravitational displacement of the first fluid by the second fluid will cause the first fluid to move upwardly into the second container.

5. The process of claim 4 wherein the first fluid is a sample of oil and gas under pressure in a well sampler and the second fluid is mercury.

6. Method of transferring fluids under pressure from one container to another without change in volume or pressure of the fluid transferred which comprises determining the pressure of the fluid to be transferred in one container, completely filling a second container with a fluid substantially inert as regards said first fluid and of greater weight than said first fluid, applying pressure to the fluid in said second container, establishing and maintaining communication between said first and second containers, said communication as regards said second container being at two points separated from each other, and disposing said second container above said first container whereby the first fluid is transferred into the second container by gravitational displacement with said second fluid, entry of the first fluid into the second container occurring substantially entirely at one of said points of communication and exit of the second fluid from the second container occurring substantially entirely from the other of said points of communication.

7. Apparatus for transferring fluids under pressure from one container to another comprising a container adapted to hold fluid under pressure, a valve in said container, a second container disposed above said first container, fluid communicating means connecting the second container with the first container through the valve in the first container, said second container and said communicating means being adapted to hold a second fluid inert as regards the first fluid and of greater weight than said fluid, means in the first container for measuring the pressure of the fluid therein, means for applying an equal pressure on the second fluid and means for opening the valve in said first container whereby said second fluid will run downwardly into the first container and displace fluid in the first container upwardly into the second container.

8. Apparatus for transferring fluids under pressure from one container to another without substantial change in volume or pressure of the fluid transferred comprising a container adapted to hold a fluid under pressure, a valve in said container, a second container, fluid connecting means connecting the first container through the valve with the second container, said second container and said communicating means being filled with a second fluid immiscible with and inert as regards the first fluid and of greater weight than said fluid, means independent of the pressure of the fluid in the first container for applying pressure to the second fluid substantially equal to the pressure of the fluid in the first container and means for opening the valve in the first container whereby said second fluid may run into the first container to gravitationally displace the first fluid therefrom.

9. The apparatus of claim 8 wherein the second container is disposed above the first container.

10. Apparatus for transferring fluids under pressure from one container to another without substantial change in volume or pressure of the fluid transferred comprising a container adapted to hold a fluid under pressure, a valve in said container, a second container, spaced fluid communicating means connecting the first container through the valve with the second container at different points, said second container and said communicating means being adapted to be filled with a liquid substantially inert and immiscible as regards the fluid in the first container and of greater weight than said fluid, means for applying pressure to the liquid in the second container and said communicating means substantially equal to the pressure of the fluid in the first container and means for opening the valve in the first container, whereby said liquid in the second container can pass through the communicating means into the first container to gravitationally displace the first fluid therefrom into the second container.

11. Apparatus for transferring fluids from one container to another, comprising a fluid container having valve means normally sealing the fluid in such container, a second container adapted to receive and hold liquid of higher specific gravity than that in the first container, valved communicating means between the first container and the second container, means for attaching the first container to the second container and for establishing communication from one container to the other through the last said valved communication means, and means in said means for attaching the first container to the second container for opening the valve of the first container to allow the fluid of the second container to be transferred thereto and to displace the fluid therein when the valves in said communication means are open.

12. Apparatus of claim 11 provided with inlet means for supplying the heavier fluid to the said second container.

13. Apparatus of claim 11 provided with inlet means for supplying the heavier fluid to the said second container, a pump, and means including said pump for determining the pressure of the fluid in the first container and applying an equal pressure to the fluid in the second container before transfer of the fluids.

14. Apparatus for transferring a sample of well fluid under pressure from a well sampler to a container without change in the volume or pressure of the well fluid, comprising a sampler and a container, a valve in said sampler, fluid communicating means connecting the container with the sampler through the valve in the sampler, said container and the said communicating means being filled with an incompressible liquid substantially inert as regards the well fluid, immiscible with the well fluid and of greater weight than said fluid, and means for opening the valve in said sampler, whereby the liquid in the container may flow into the sampler to gravitationally displace the well fluid therefrom into the container.

15. Apparatus for transferring a sample of well fluid under pressure from a well sampler to a container without change in volume or pressure of the well fluid, comprising a sampler and a container; a valve in said sampler, fluid communicating means connecting the container with the sampler through the valve in the sampler, said container and said communicating means being filled with a second fluid immiscible with and substantially inert as regards said well fluid, said first fluid and said second fluid being of different specific gravity, means independent of the pressure of the fluid in the sampler for applying pressure to the second fluid in the container and communicating means, and means for opening the valve in said sampler, whereby the fluid in the first container and the fluid in the second container may exchange places through gravitational displacement of one by the other.

GEORGE W. RUSLER.